3,101,243
PRE-HEAT PROCESS FOR MOLDING CORK BLOCKS

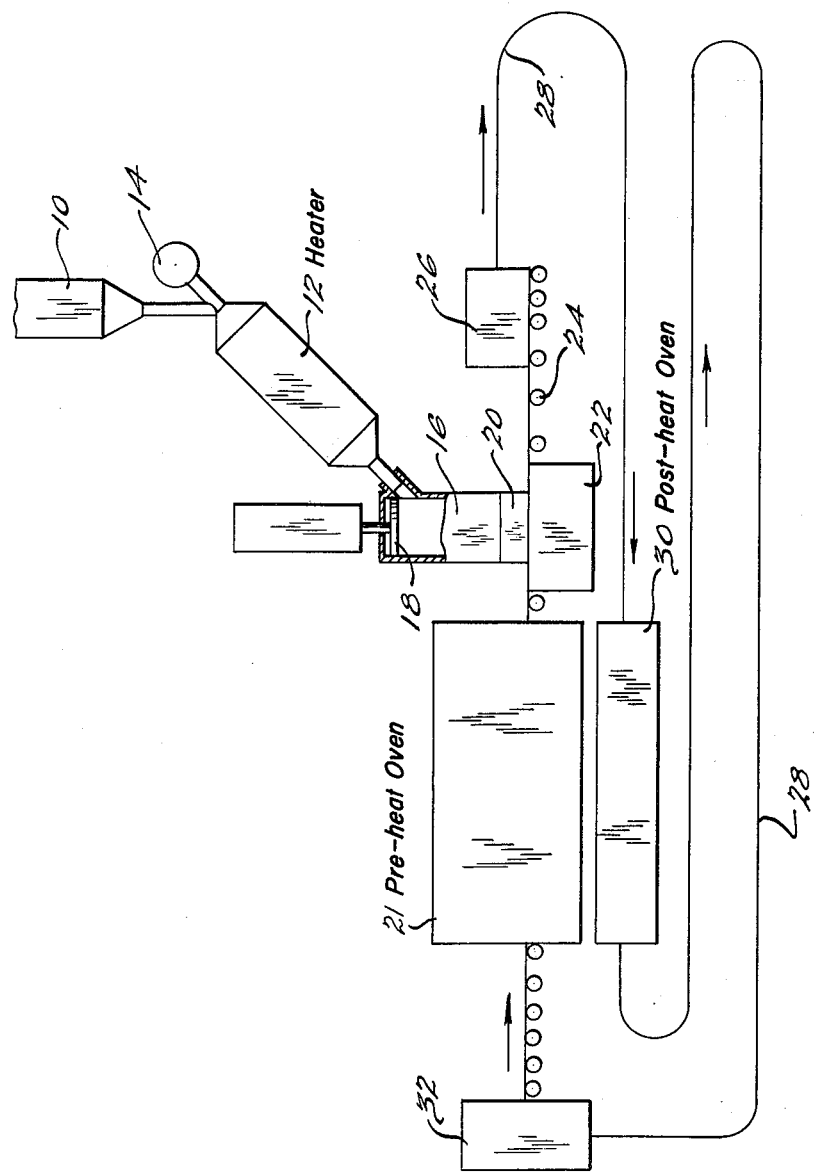

Richard H. Hawkes, Norfolk, Va., assignor to Sheller Manufacturing Corporation, Detroit, Mich., a corporation of Indiana
Filed Sept. 25, 1959, Ser. No. 842,282
5 Claims. (Cl. 18—48)

This invention relates generally to the molding of cork into blocks which are subsequently sliced or cut into thin sheets, from which the ultimate cork products such as gaskets, tile, etc., are formed, and more particularly to an improved method for molding cork blocks.

There are two known commercial methods employed for the molding of cork composition blocks. In the first method, which has been in use for many years, granulated cork is mixed with a binder containing a thermosetting adhesive, a charge of this mix is weighed and compressed into a mold of the desired shape which is then locked so that the cork and binder mixture is retained therein under compression. The mold with the cork composition therein is then heated in a hot air oven until the temperature of the cork and binder mass is raised to a temperature such that the thermosetting adhesive solidifies and becomes permanently infusible. In this process, it is difficult to transfer the oven heat to the cold mold and subsequently to the center of the cold cork which must be accomplished in order to get the proper curing temperature at the center of the compressed cork mass. It is very difficult to heat the center of the block without overheating the outside areas of the block and for this reason long heating times are required and it has not been found practicable to exceed a maximum of four inches in block thickness.

The second known method involves the dielectric heating of the mold and binder mass after it has been compressed in the mold and locked therein. In this method uniform heating is achieved but considerable expense is involved in installing a system for dielectrically heating cork blocks on a production basis.

The object of this invention is to provide a method of molding cork composition blocks which is relatively simple, inexpensive to install on a production basis and effective to provide for uniform heating of the cork blocks. In the method of this invention, predetermined quantities of granulated cork and a binder containing the thermosetting adhesive are mixed, and the resulting loose mass, without any molding or compressing is pre-heated to a temperature sufficient to solidify the thermosetting resin after this temperature has been maintained for a predetermined time period. The heated charge of cork and binder is then transferred quickly, before any solidifying of the binder has taken place, into a mold which has also been preheated to the same temperature as the charge. The pre-heated cork and binder mixture is compressed in the mold and the compressed mixture is then locked into the mold, following which the mold is placed in an oven which is at substantially the same temperature as the pre-heated mold and the pre-heated mixture. The mold with the cork and binder mixture therein is retained in the oven for a time period sufficient to completely solidify the binder to thereby form the cork composition block. When the resulting cork block has been removed from the mold, and cooled, either before removal from the mold or after removal from the mold, it is evenly cured and molds exceeding the previous four inch maximum thickness can be satisfactorily manufactured.

Further objects, features and advantages of this invention will become apparent from a consideration of the following description, the appended claims and the accompanying drawing which is a diagrammatic illustration of the method of this invention.

With reference to the drawing, a charging bin 10 for a granulated cork and binder mixture discharges at its lower end into the upper end of an inclined heater 12, and a feeder 14 is provided adjacent the upper end of the heater 12 for feeding hexamethylene tetramine into the cork and binder mixture in the heater 12 when desired. Suitable mechanism (not shown) is provided for directing the desired mixture of granulated cork and a binder which includes a thermosetting resin into the charging bin 10.

A heated mixture of granulated cork and binder discharges from the lower end of the heater 12 into a mold 20 disposed on a bed 22 below the piston 18 in a press 16 which is provided for compressing a charge of the mixture in the mold. The mold 20 is not described in detail herein, because it may be of any conventional type and of any desired shape. It includes a top cover, which is applied after the cork and binder mixture has been compressed in the mold, for retaining the mixture under compression during the subsequent heating described hereinafter. The mold is pre-heated in a pre-heat oven 21 prior to travel onto the bed 22 for charging.

The mold 20 travels from the bed 22 on a horizontal conveyor 24 to a hang station 26 where the mold is tilted onto its side and hung on a mono-rail conveyor 28. The mold travels on the conveyor 28 into a post-heat oven 30 which maintains the mold and the charge therein at substantially the pre-heat temperature to prevent too rapid cooling of the mold and the cork mixture adjacent the mold surfaces. The mold remains in the oven 30 for a time period sufficient to provide for solidification of the thermosetting binder with a resulting "curing" of the cork composition block in the mold. From the post-heat oven 30, the mold with the cured block therein travels on the conveyor 28 at room temperature for a time period sufficient to cool the block to an extent necessary to relieve the stresses therein. It is to be understood, of course, that a cork block can be removed from its mold and cooled outside the mold if precautions are taken to prevent re-expansion of the compressed cork granules.

A mold on the conveyor 28 ultimately travels to an unlock and eject station 32 where the block is removed from the mold and the empty mold is then placed on the conveyor 24 for travel into the pre-heat oven 21 where it is again pre-heated for subsequent use at the press 16 for receiving another charge of granulated cork and binder.

In one embodiment of the invention, ninety pounds of binder, consisting of thirty pounds of phenolformaldehyde resin and sixty pounds of triethylene glycol, which is a cork softening agent, are mixed with two hundred and fifty pounds of 5 to 10 mesh (U.S. Standard) new cork and seventy pounds of reground cork. Ninety pounds of this binder and cork mixture is then placed in the revolving drum-heater 12 and heated to 240° F. The heated mix is then emptied from the heater into a 9" x 25" x 37" steel mold which has been pre-heated in the oven 21 to 240° F. and is disposed on the bed 22. The press 16 is operated to compress the cork and binder mixture in the mold 20, and following compression, the mold cover is locked to the mold and the mold is conveyed to the oven 30 which contains hot air maintained at a temperature of 250° F. The post heat oven temperature may be lower than the pre-heat temperature if desired. The purpose of the post heat oven is to prevent too rapid cooling of the mold and the cork mixture adjacent to the mold surfaces. It is not necessary that the post heat oven supply any additional heat to the mold or the cork mixture. The mold 20 remains in the oven 30 for two hours following which it is cooled on conveyor 28 for 12 hours and the cured composition block is then removed.

In a second embodiment of the invention, 110 pounds of binder, consisting of 30.2 pounds of commercial animal glue, 25.3 pounds of water, 26.2 pounds of glycerine, 12.7 pounds triethylene glycol, and 15.6 pounds of sorbitol, is mixed with 270 pounds of 5 to 10 mesh (U.S. Standard) new cork and 100 pounds of 5 to 10 mesh reground cork. Glycerine is a cork softening agent, commercial animal glue is the adhesive employed, and water is employed to facilitate distribution of the glue over the cork granules. The triethylene glycol and the sorbitol are also cork softening agents and either the glycol, the glycerine or the sorbitol could be used alone or could be replaced with other polyhydric alcohols. Ninety pounds of this binder and cork mixture is placed in a rotating drum-heater and heated to 200° F., following which three-fourths of a pound of hexamethylene tetramine, which is effective in insolubilizing the glue, is added two minutes before the material reaches 200° F. The heated charge is then deposited in a mold 20 at the press 16, and the balance of the method is the same as described in connection with the first embodiment of the invention. Both embodiments will produce cork blocks of 17 pounds per cubic foot minimum density which are uniform in all respects.

From the above description, it is seen that this invention provides a method of producing cork blocks which is simple, does not require a large number of expensive molds for the continuous production of cork blocks and can be used to produce relatively thick blocks of uniform density. The particular heat activatable binder employed is not significant to the practice of this invention which may be advantageously employed with any heat activatable binder useful in the manufacture of cork composition. The method takes advantage of the fact that activation of the binder to a permanently infusible condition is a function of time and temperature, so that the cork and binder can be efficiently pre-heated without danger of premature solidifying of the binder. The method is practiced so that the time period necessary for solidification of the binder does not elapse until the binder and cork mixture has been compressed and maintained at substantially the pre-heat temperature for a time period. It has been found that with presently known binders the pre-heat temperature may be varied between about 200° F. and 280° F. with a corresponding adjustment of the heating time in oven 30 to obtain satisfactory results. The lower the temperature, the longer time required in oven 30 and the higher the temperature the more danger there is of premature solidification of the binder. Given a satisfactory binder, the post-heat time is adjusted to give optimum production results. It is to be understood also that other particles, such as rubber, can be mixed in small amounts into the granulated cork without affecting the results described above.

It will be understood, that the specific details of the improved method for producing cork blocks which is herein disclosed and described is presented for purposes of explanation and illustration, and is not intended to indicate the limits of the invention, the scope of which is defined by the following claims.

What is claimed is:

1. The method of molding cork composition blocks comprising mixing granulated cork with a thermosettable binder, pre-heating said mixture while agitating the same to a temperature at which the binder will become permanently infusible when maintained at said temperature for a predetermined time period, pre-heating a mold to substantially said temperature, placing said heated mixture in said heated mold, compressing said mixture in said mold before said predetermined time period has elapsed and heating the said mold and mixture so as to maintain substantially said temperature for said predetermined time period.

2. The method of molding cork composition blocks comprising mixing a thermosettable binder comprising phenol-formaldehyde resin and triethylene glycol with granulated cork, pre-heating said mixture while agitating the same to a temperature of about 240° F., pre-heating a mold to a temperature of about 240° F., placing said mixture in said mold, compressing said cork and binder mass in said mold, and subjecting said mold and mass to a heat of about 250° F. for a time period of at least about two hours.

3. The method of molding cork composition blocks comprising mixing granulated cork with a thermosettable binder, pre-heating said material while agitating the same to a temperature of between 200° F. and 280° F., pre-heating a mold to substantially the same temperature as said mixture, transferring a charge consisting of a predetermined quantity of said mixture to said mold before said binder has been at said temperature for a time period sufficient for the binder to become permanently infusible, compressing said charge in said mold, and subjecting said mold and charge to substantially said pre-heat temperature for a time period sufficient for said binder to become permanently infusible.

4. A method of molding cork composition blocks in accordance with claim 1 wherein said thermosettable binder comprises glue, glycerine and water.

5. A method of molding cork composition blocks in accordance with claim 1 wherein said binder comprises phenol formaldehyde resin and triethylene glycol.

References Cited in the file of this patent

UNITED STATES PATENTS

| | | |
|---|---|---|
| 1,035,146 | Bentley | Aug. 13, 1912 |
| 1,917,361 | Champney | July 11, 1933 |
| 2,066,988 | Lee | Jan. 5, 1937 |
| 2,293,805 | Cooke | Aug. 25, 1942 |
| 2,301,148 | Schwarz | Nov. 3, 1942 |
| 2,308,632 | Stenberg | Jan. 19, 1943 |
| 2,719,329 | Gard | Oct. 4, 1955 |